United States Patent [11] 3,619,241

[72] Inventors: Walter V. Goedell, Poway; Charles S. Luby, San Diego, both of Calif.
[21] Appl. No.: 649,785
[22] Filed: June 9, 1967
[23] Division of Ser. No. 272,199, Apr. 11, 1963, Pat. No. 3,325,363
[45] Patented: Nov. 9, 1971
[73] Assignee: Gulf Oil Corporation

[54] PROCESS FOR MAKING PYROLYTIC CARBON COATED NUCLEAR FUEL OR POISON
6 Claims, No Drawings

[52] U.S. Cl. .................................... 117/46, 176/67, 176/91
[50] Field of Search ........................... 117/46 CG; 176/67, 91 SP

[56] References Cited
UNITED STATES PATENTS
1,247,008  4/1966  Finicle ................ 176/91 (SP) X

OTHER REFERENCES

Ubbelohde et al., Graphite and Its Crystal Compounds, London Oxford Press, 1960, p. 19 QD 181 C1U3

AEC Document, BMT-1468, Sept. 13, 1960, p. 11, Copy in 176–91

Rusinko et al., Carbon Formation in the Pyrolysis of Hydrocarbons. In Proceedings of the Conference on Carbon, Macmillan, N.Y. Vol. 1, 1963, p. 397, 398, QD 181C1 C6 1961.

Corley-Macquley et al., Studies on the Deposition of Pyrolytic Carbon. In Proceedings of the Conference on Carbon, N.Y., Macmillan, Vol.2, 1963, p. 452, 458, QD 181C1C6, 1961

Primary Examiner—Alfred L. Leavitt
Assistant Examiner—Janyce A. Bell
Attorney—Fitch, Even, Tabin & Luedeka ABSTRACT: A method of manufacturing a nuclear fuel or poison which includes heating particulate nuclear fuel or poison to between about 800° C. and 1400° C., contacting the heated material with an acetylene containing atmosphere having an acetylene partial pressure of at least about 0.65 atmosphere to deposit a spongy pyrolytic carbon coating on the particles followed by depositing a dense exterior fission products retentive coating on the spongy carbon coating.

PROCESS FOR MAKING PYROLYTIC CARBON COATED NUCLEAR FUEL OR POISON

This application is a division of copending application Ser. No. 272,199, filed Apr. 11, 1963, U.S. Pat. No. 3,325,363.

This invention relates to a shape having increased structural stability, and more particularly to a multicoated shape having a protective shock absorbing coating which imparts increased structural stability to the shape under conditions of thermal stress.

Fuel elements which do not require a metal clad have been found to be desirable for use in high temperature gas cooled nuclear reactors. One function of the clad is to retain condensable fission products within the fuel element. Therefore, fuel elements which do not have a clad employ coated fissionable fuels which retain greater proportions of the condensable fission products within the fuel element. The fission products retaining coating is normally a dense, thermally conductive coating which is of a hard and brittle nature.

Poisons are desirably included within nuclear reactors to control excess reactivity. Additionally, burnable poisons are included within reactor control rods or fuel elements to extend the reactivity lifetime of the fuel element and to decrease the number of control rods required within the reactor.

When poisons having vapor pressure retentive coatings thereon; and fissionable fuels having fission products retentive coatings thereon; are employed in high temperature nuclear reactors, it has been found that the thermal and irradiation stresses to which the coated fuels and poisons are subjected results in the rupture of the retentive exterior coating, and allows the escape of vaporized poison and fission products.

It is a principal object of the invention to provide shapes having increased structural stability. It is an additional object to provide shapes having increased structural stability under conditions of thermal stress. It is a further object to provide a fissionable fuel which has increased stability and increased retention of condensable fission products and a fuel element containing such a fuel. Another object is to provide a poison for use in nuclear reactors which has increased structural stability and a decreased rate of vaporization. Yet another object is to provide a method for increasing the structural stability of coated shapes. A still further object is to provide a shape which has increased stability under conditions of thermal stress which is convenient and economical to construct.

These and other objects are more particularly set forth in the following detailed description.

In general, the present invention relates to a shape which has increased structural stability and to a method for protecting such a shape comprising a core which is provided with an exterior retentive coating and a shock absorbing, low density, spongy coating interposed between the core and the exterior coating, preferably the spongy coating comprises low density pyrolytic carbon.

The present invention has particular application in the protection of nuclear fuels and poison, and in particular particulate nuclear fuels and poisons. For purposes of description of the invention will be described as applied to nuclear fuels and poison, although other uses are contemplated.

The use of a dense, thermally conductive coating to improve the fission products retention characteristics of fissionable fuels is known. In connection with this, various coated fissionable fuels, including metals such as uranium, thorium, plutonium and compounds such as uranium dioxide, thorium dioxide, uranium carbide, uranium dicarbide and thorium dicarbide etc., are known. Some fissionable fuels undergo reactions with coating materials at reactor operating conditions. Essentially nonreactive carbide and dicarbide fissionable fuels are considered better suited for use with retentive coatings. A particular fissionable fuel which has desirable characteristics for use in high temperature nuclear reactors, and which is relatively inert with respect to coating materials, is a dicarbide of a fissionable material for instance, uranium dicarbide or a mixture of uranium dicarbide and thorium dicarbide. Discrete coated particles of uranium dicarbide or a mixture of discrete particles of uranium dicarbide and thorium dicarbide has been found to be advantageous for use as a nuclear fuel. A fuel comprising a mixture of uranium dicarbide and thorium dicarbide in which the ratio of thorium to uranium is approximately 10 to 1 has been found to provide superior results. Although carbide and dicarbide fuels have good structural characteristics, they are susceptible to hydrolysis when exposed to the atmosphere and do not have any marked fission products retention unless they are provided with a retentive coating.

Pyrolytic carbon, which is of a dense, thermally conductive nature, and which has a definite crystalline structure closely approaching that of a graphite has been found to be a desirable fission products retaining coating for fissionable fuels and increases the retention of condensable fission products within the fissionable fuel. Metallic carbides, such as silicon carbide, zirconium carbide and niobium carbide have also been found to be useful in retaining fission products within fissionable fuels. Additionally, plural layers of metallic carbides and pyrolytic carbon have been found to be desirable under particular operating conditions, for instance, to retain cesium within the fissionable fuel. A dense pyrolytic carbon coating also prevents hydrolysis of carbide and dicarbide fuels. A dense thermally conductive pyrolytic carbon coating similar to that used to retain fission products can also be applied to nuclear poisons which have relatively high vapor pressures, i.e., boron carbide, and gadolinium carbide, to prevent the vaporization of the poison at the reactor operating conditions.

The so-called "engineered" fuels and poisons containing various coating which improve certain characteristics of the fuel particles or poisons are generally superior to uncoated fuels and poisons. However, the coating employed, i.e., dense, thermally conductive pyrolytic carbon or metallic carbides, are brittle in nature and have been found to rupture and crack during high temperature irradiation. When the retentive pyrolytic carbon or metallic carbide coating becomes ruptured the retentive characteristics of the coating are greatly diminished resulting in the escape of fission products or the vaporization of the poison. Failure of the brittle coatings can be attributed to several effects which occur during operation of the reactor at high temperatures. Some effects which are believed to cause failure of the retentive coating are: 1 damage to the coating from fission recoils into the inner surface of the coating which result in the generation and propagation of cracks through the coating; and 2 stress generated in the coating from differential thermal or irradiation expansion within the particle and coating which result in the rupture of the coating.

Fuel particles coated with dense, thermally conductive pyrolytic carbon are susceptible to a particular thermal stress which has been called the "amoeba effect." The "amoeba effect" causes migration at high temperatures of the uranium dicarbide-thorium dicarbide fuel encased within the pyrolytic carbon coating toward the hottest side of the coated particle. At temperatures in excess of 1800° C. at the center of the fuel element, the fuel core within the particle at the exterior of the fuel element, where the temperature is approximately 150° C. lower migrates sufficiently to fracture the dense pyrolytic carbon coating. Fuel particles located at the centerline of the fuel element, where the maximum temperature occurs, show almost no "amoeba effect."

It has been found that rupture of an exterior brittle coating under conditions of thermal stress can be greatly reduced by interposing a shock absorbing layer of a low density spongy material between the shape which is to be protected and the brittle exterior coating. The interposition of a low density, spongy material between the shape to be protected and the exterior brittle coating has been found to be particularly desirable in the protection of nuclear fuels and poisons. The spongy coating absorbs thermal and irradiation stresses occurring within the fuel or poison and prevents the transmission of these stresses to the brittle exterior coating. A preferable low density, spongy coating is also capable of absorbing fission recoils so that they will not damage the dense, brittle exterior coating. A material which has been found to be particularly advantageous for the protection of shapes which have been provided with a brittle exterior coating is a low density, spongy pyrolytic carbon coating. The low density, spongy carbon coating absorbs both thermal stresses and fission recoils and provides increased stability to fissionable fuels and nuclear poison as well as to other coated shapes. The low density, spongy, pyrolytic carbon coating is to be differentiated from the highly dense, crystalline exterior pyrolytic carbon coating which is utilized as a retentive coating. The spongy pyrolytic carbon coating preferably is applied to the shape to be protected in a manner so as to produce an amorphous carbon of the lowest possible density which will adhere to the shape to be protected. When compared to the dense, brittle, exterior pyrolytic carbon coating, the spongy pyrolytic carbon coating is soft in nature and is easily scraped or flaked from the surface of the shape while the dense pyrolytic carbon coating is hard and brittle and cannot be easily removed from the surface of the shape.

The low density, spongy, pyrolytic carbon coating is preferably applied to fissionable fuels in a thickness of approximately one to two fission "recoil ranges." A "recoil range" is the range or distance of travel of the fission products within a given material, e.g., spongy carbon. Spongy carbon has a "recoil range" of 12–25 microns. The coating is preferably applied in a thickness of two "recoil ranges," that is, from about 25 to 50 microns. It has been found that when the spongy carbon coating has a thickness of approximately two recoil ranges, it will absorb nearly all of the fission recoils and will prevent the fission recoils from striking and rupturing the dense brittle exterior pyrolytic carbon coating.

A spongy pyrolytic carbon coating of approximately the same thickness, that is, from 12 to 50 microns, will also prevent the transmittal of thermal and irradiation stresses to the brittle exterior coating. When a fissionable fuel or a nuclear poison is provided with a coating of low density, spongy, pyrolytic carbon, thermal and irradiation stresses are absorbed by the protective spongy coating and are not transmitted to the brittle exterior coating. The use of a low density, spongy, pyrolytic carbon coating has also been found to reduce or eliminate the rupture of the dense exterior coating on fuel particles due to the "amoeba effect" which occurs in fuel particles which are employed in high temperature reactors.

The low density, spongy, pyrolytic carbon coating can be applied to a fissionable fuel, e.g., uranium dicarbide or a uranium dicarbide-thorium dicarbide mixture, or to a burnable poison such as boron carbide or gadolinium carbide, in any convenient manner. For example, uranium dicarbide-thorium dicarbide particles or boron carbide particles can be dispersed as a fluid bed in a stream of heated helium gas within a heated graphite reaction tube at a temperature of about 800° C. to 1400° C. The helium is preferably preheated to a temperature of about 400° C. A substance which is capable of producing low density, spongy carbon upon decomposition, i.e., acetylene gas, at a relatively high partial pressure, e.g., approximately 0.65 atmospheres is mixed with the stream of helium gas. Any other material which produces a low density, spongy, pyrolytic carbon upon decomposition, can also be employed. At temperature in excess of 800° C. the acetylene gas decomposes upon the surface of the particles and forms a low density, spongy, pyrolytic carbon coating on the surface of the particles. When the desired thickness of spongy carbon, e.g., 12 to 50 microns, has been deposited on the surface of the fuel particles the flow of acetylene gas is terminated. The particular operating conditions for forming the spongy carbon coating can be varied as desired in order to produce a spongy carbon coating of the lowest density which will adhere to the fuel particles. The geometry of the reaction tube and the size and shape of the fissionable fuel which is to be coated are determinative of the flow rate of the acetylene or other spongy carbon producing material.

The particles can be provided with a dense exterior coating of pyrolytic carbon in the same apparatus used for depositing the spongy carbon coating or in a different apparatus as desired. When the dense exterior coating is applied in the same apparatus, the temperature of the reaction tube is raised to a temperature of about 1400° C. to 2200° C. while continuing the flow of helium gas. Methane, at a partial pressure of approximately 0.15 atmospheres, is admixed with the helium gas and is passed into contact with the hot spongy carbon coated particles where it decomposes. The decomposed methane provides the spongy carbon coated fuel with a dense, brittle, thermally conductive outer coating of pyrolytic carbon which provides improved retention of condensable fission products within the fuel body. A coating of a thickness of about 20 microns to 60 microns has been found to provide improved fission products retention.

EXAMPLE I

A particulate uranium dicarbide-thorium dicarbide fissionable fuel mixture is prepared from a mixture of powdered thorium dioxide, powdered uranium dioxide and powdered carbon. The uranium dioxide employed is of the enriched variety, containing 91 percent to 93 percent of $U235$. 10 grams of thorium dioxide, containing 88 percent thorium, is admixed with each gram of uranium dioxide in order to provide a fissionable uranium dicrabide-thorium dicarbide fuel having a 10 to 1 thorium to uranium ratio. Carbon is added in an amount in excess of the stoichiometric amount required for conversion of the dioxides to dicarbides and a binder of 2 percent by weight ethyl cellulose is added to the mixture of dioxides and carbon.

The powdered thorium dioxide, uranium dioxide, carbon and ethyl cellulose is intimately combined together while dry, and trichloroethylene solvent for the ethyl cellulose binder is added to dissolve the ethyl cellulose and form a slurry. The slurry is agitated to obtain agglomerated particles of thorium dioxide, uranium dioxide and carbon of a size of about 295 to 500 microns which are oven dried at 140° F. The dried agglomerated particles of thorium dioxide, uranium dioxide and carbon are mixed together with graphite flour, e.g., graphite having an average particle size of less than 20 microns, in a particle to graphite weight ratio of 8 to 1, and are reacted in a graphite crucible under vacuum at a temperature of 2200° C. to reduce the dioxides to dicarbides. The presence of an excess amount of carbon causes the formation of a solid solution of a eutectic of thorium dicarbide, uranium dicarbide and carbon rather than stoichiometric dicarbides. After the dioxides have been completely reduced to dicarbides the temperature is raised to 2500° C. to melt and densify the particles of uranium dicarbide-thorium dicarbide. The presence of the graphite flour prevents coalescence of the uranium dicarbide-thorium dicarbide particles which are maintained as dispersed particles by the graphite flour. Upon cooling, dense, nearly spherical particles, of a size of 175 microns to 300 microns, of a solid solution of uranium dicarbide and thorium dicarbide are obtained.

A raphite reaction tube one inch in diameter is heated to 1200° C. and helium gas which is preheated to 400° C. is passed through the tube at a flow rate of 4000 cubic centimeters per minute. 50 grams of the uranium dicarbide-thorium dicarbide fissionable fuel of a particle size of 175 microns to 300 microns, is dropped into the reaction tube and fluidized in the helium gas stream. When the temperature of the fuel particles reaches 1200° C., acetylene gas, at a partial pressure of 0.65 atmospheres is admixed with the helium gas stream. The acetylene gas decomposes and deposits low density spongy carbon upon the fuel particles. The acetylene gas flow is continued until a low density, spongy, carbon coating of 40 microns is deposited upon the fuel particles. The acetylene gas flow is terminated and the temperature of the reaction tube is raised to 1400° C. At this temperature methane gas, at a partial pressure of 0.35 atmospheres, is admixed with the helium gas and passed into the reaction tube where it decomposes to deposited a dense, retentive, pyrolytic carbon coating over the spongy carbon coating. The methane gas flow is continued until a pyrolytic carbon of a thickness of 50 microns is obtained. The methane gas flow is terminated and the fuel particles are cooled in helium and removed from the reaction tube.

EXAMPLE II

Uranium dicarbide-thorium dicarbide fuel particles are provided with a low density, spongy, pyrolytic carbon coating in a manner as set forth in example I. The low density, spongy, carbon coated particles are then coated with a zirconium carbide coating. The particles are dispersed as a fluid bed in a stream of argon gas in graphite reaction tube. The temperature of the particles is raised to 1500° C. and gaseous zirconium tetrachloride and methane are passed into contact with the hot fuel particles where they decompose to form a zirconium carbide coating on the fuel particles. The zirconium tetrachloride flow is maintained until a zirconium carbide coating of 2 mils in thickness is obtained. The fuel particles are then provided with a dense, brittle, thermally conductive pyrolytic carbon coating according to the method of example 1.

EXAMPLE III

Boron carbide poison particles, having an average size of approximately 20 microns, are provided with a low density shock absorbing spongy carbon coating and an exterior dense, thermally conductive pyrolytic carbon coating according to the method of example I. The coated boron carbide particles produced have a spongy carbon coating of a thickness of approximately 20 microns and a dense pyrolytic carbon coating of a thickness of 40 microns.

The fuel particles and poisons obtained are found to have increased structural stability under conditions of thermal stress and can be employed in high temperature nuclear reactors over extended period of time without failure of the dense and brittle exterior coating.

A fissionable fuel or poison which has been coated with a protective layer of low density, spongy, pyrolytic carbon and an exterior retentive layer of a dense, brittle, pyrolytic carbon can be incorporated within various fuel elements for use in nuclear reactors. The fuel elements for use in nuclear reactors. The fuel elements can be either self-purged or force-purged as may be desired. However, the improved fission product retention characteristics of the dense pyrolytic carbon coated fuel makes this fuel desirable for use in self-purged fuel elements.

The coated fuel can be employed within the fuel element in any shape that is found to be convenient. In conjunction with this, discrete particles of fissionable fuel coated with a protective layer of low density, spongy, pyrolytic carbon and a dense pyrolytic carbon exterior coating has been found to be desirable. The coated fuel particles can be dispersed in a graphite matrix and compressed into fuel compacts, or can be employed in the form of a packed bed of discrete particles as described in the copending application of Stanley L. Koutz, Ser. No. 257,989, filed Feb. 12, 1963, and assigned to the assignee of the present invention. The fuel particles can be dispersed in a graphite matrix using pitch as a binder by mixing the coated fuel particles and powdered graphite in a blender, adding pitch dissolved in trichloroethylene solvent to form a paste, spreading the paste in a thin sheet which is diced and dried. The dried paste is warm pressed at 75° C. and 4000 p.s.i. to form a fuel compact. The compact can then be best treated to stabilize the compact dimensions.

Although the invention has been particularly described with respect to the fissionable fuel of uranium dicarbide or a mixture of uranium dicarbide and thorium dicarbide and to a burnable poison of boron carbide and gadolinium carbide, it is understood that other fissionable materials and other poisons can be provided with a protective coating of low density, spongy, pyrolytic carbon and an exterior retentive coating to provide improved structural stability and fission products or vapor pressure retention. Likewise, various shaped fissionable fuel bodies can be provided with these coatings, and although a particulate fissionable fuel has been described, it is intended that the coatings can be applied to other shapes such as rods, compacts, annuluses, etc. Further, although the use of a spongy low density protective coating is particularly suited for application to materials employed in nuclear reactors, it is not intended that the invention be limited thereto. For example, a catalyst which has a brittle exterior coating may be provided with a protective low density, spongy pyrolytic carbon coating to improve its stability at high temperatures.

It can be seen that a means has been provided for increasing the structural stability of shapes subjected to thermal stress. Additionally, a fissionable fuel having increased stability and fission products retention characteristics has been provided. Fissionable fuels having a coating of a shock absorbing low density spongy pyrolytic carbon and an exterior coating of pyrolytic carbon are suitable for use in high temperature reactors, and may be employed within fuel elements in the form of particles dispersed in a graphite matrix or in the form of a packed bed of discrete particles. A nuclear poison having increased vapor pressure retention and structural stability has also been provided.

Various of the features of the invention are set forth in the following claims.

We claim

1. The method of manufacturing a nuclear fuel or poison comprising heating a particulate fissionable fuel or poison to a temperature of between about 800° C. and about 1400° C., contacting the heated fuel or poison with a gaseous acetylene containing atmosphere having an acetylene partial pressure of at least about 0.65 atmospheres for a period of time sufficient to deposit a low density spongy pyrolytic carbon coating on the fuel or poison having a thickness of at least about 25 microns, and thereafter depositing a dense exterior fission products retaining coating on the spongy carbon coating.

2. The method of manufacturing a nuclear fuel or poison in accordance with claim 1 wherein after the spongy carbon coating has been deposited, the temperature of the fuel or poison is raised to between about 1400° C. and about 2200° C. and the coated fuel or poison is contacted with a gaseous atmosphere containing methane for a period of time sufficient to form an exterior dense fission products retaining pyrolytic carbon coating having a thickness of at least about 20 microns.

3. The method of manufacturing a nuclear fuel or poison in accordance with claim 1 wherein the particulate fuel or poison is suspended in an inert fluidizing gas.

4. The method of manufacturing a nuclear fuel or poison in accordance with claim 1 wherein the heated fuel or poison is contacted with the acetylene containing atmosphere for a period of time sufficient to deposit a spongy carbon coating having a thickness of between about 25 and about 50 microns.

5. The method of manufacturing a nuclear fuel or poison in accordance with claim 4 wherein the heated fuel or poison is contacted with the acetylene containing atmosphere for a period of time sufficient to deposit a spongy carbon coating having a thickness of between about 25 and about 50 microns.

6. The method of manufacturing a nuclear fuel or poison in accordance with claim 4 wherein the particulate fuel or poison is suspended in an inert fluidizing gas.

* * * * *

UNITED STATES PATENT OFFICE
CERTIFICATE OF CORRECTION

Patent No. 3,619,241    Dated November 9, 1971

Inventor(s) Walter V. Goeddel and Charles S. Luby

It is certified that error appears in the above-identified patent and that said Letters Patent are hereby corrected as shown below:

First page, 72] - after "Inventors" read "Walter V. Goeddel" instead of "Walter V. Goedell".

Column 3, line 63 - for "temperature" read "temperatures".

Column 4, line 24 - for "U235" read "$U_{235}$".

Column 4, line 58 - for "raphite" read "graphite".

Column 5, line 37 - for "period" read "periods".

Column 5, lines 43-44 - delete "The fuel elements for use in nuclear reactors."

Column 5, line 51 - for "of fissionable" read "of a fissionable".

Column 5, line 64 - for "75°C." read "750°C".

Column 5, lines 65-66 - for "best treated" read "heat treated".

Signed and sealed this 25th day of April 1972.

(SEAL)
Attest:

EDWARD M. FLETCHER, JR.
Attesting Officer

ROBERT GOTTSCHALK
Commissioner of Patents